Patented Nov. 10, 1936

2,060,457

UNITED STATES PATENT OFFICE 2,060,457

PHENOLIC CONDENSATION PRODUCTS AND METHOD OF PRODUCING SAME

George Barsky, New York, N. Y.

No Drawing. Application October 9, 1934, Serial No. 747,564

19 Claims. (Cl. 260—4)

This invention relates to condensation products of phenol and formaldehyde, more particularly to such products of the casting type.

It is among the objects of this invention to provide a process and a product resulting therefrom whereby light colored, light stable, substantially transparent masses may be produced. It is a further object of this invention to devise a simplified procedure which does not require as much skilled labor as prior processes, which is more economical, and which avoids the use of certain substances heretofore regarded as necessary.

It has been well known that phenol and formaldehyde in water solution may be caused to react by the use of suitable catalysts at an elevated temperature. Such reactions were used to produce resins of the molding type wherein the reaction was carried along, generally to such a point that the reacting mixture separated into two layers, one of which was the liquid resin. This was mixed with suitable filling materials and other substances as required and subjected to heat and pressure to permanently harden the material. Various catalysts have been proposed, among which are: the caustic alkali, borax, tri-sodium phosphate, alkali metal carbonates, ammonia, hexamethylene tetramine and the like. Products of this character were dark colored due to the formation of colored by-products during the process.

It has also been proposed to manufacture resins of the casting type wherein the reaction was caused to proceed in two stages instead of the single stage of the molding resin. In the first stage, the phenol and formaldehyde were condensed with an alkaline catalyst and generally the proportion of phenol to formaldehyde was 1 mol. of phenol to about 2½ mols of formaldehyde. The condensation reaction took place at the boiling point of the mixture with the use of a reflux condenser. Then a sufficient amount of acid was added to neutralize all of the alkali and the mass was subjected to distillation in a vacuum to remove the water. By this process light colored products were made, because by neutralization of the alkali oxidation was prevented and thus formation of colored compounds was avoided.

In general, careful control of the amount of alkali was required and considerable skill was necessary in the manipulation, especially at the point where the acid was added. While most acids might be suitable for this purpose, actual practice showed that only a few acids, such as lactic or phthalic were suitable. These acids are, of course, relatively expensive.

My invention is adapted to produce phenolic condensation products of the casting type by a simple one-stage operation. I avoid the use of any acid in the process and I merely add a suitable catalyst at the beginning of the operation, which catalyst is capable of causing condensation to take place without the formation of colored compounds.

In practicing my invention I provide a mixture of phenol and formaldehyde solution in suitable proportions. In general, I may use 1 mol. of phenol to from 1-3 mols of formaldehyde. To the mixture I add a catalyst which is a combination of an alkali and boric acid. The proportions of the two ingredients are such that the alkali is present in the ratio of more than 1 chemical equivalent to 1 chemical equivalent of boric acid. If too much alkali is present colored products will result, whereas, if too little alkali is used the resin is not hardening or thermoreactive. I need not use free alkali and free boric acid as I have found that I may use alkali borates, such as the metaborates or borax, and adding to the same a sufficient amount of the alkali to give the desired ratio. If borax alone is used as a catalyst, heat hardening products do not result, as is also the case where there is added to the borax an equivalent amount of alkali to completely neutralize the boric acid. However, if a certain excess of alkali is present over that necessary to combine with the boric acid, considering the same as monobasic, excellent results are obtained.

The following are examples of the practice of my invention:

*Example 1.*—100 parts by weight of 94% phenol were mixed with 241 parts by weight of 40% by volume formaldehyde solution in water. To this was added 8 parts by weight of sodium metaborate ($Na_2B_2O_4.8H_2O$) and 5.5 parts by weight of 2.42N sodium hydroxide solution. The mixture was heated to boiling with the use of a reflux condenser and boiling was continued for one hour. 12 parts by weight of glycerin were then added and the mass evaporated under a vacuum of 27 inches of mercury to such a point that the mixture was still sufficiently fluid so that it could be readily poured into suitable molds and placed in an oven at 75° C. for about 80 hours. It was set to a firm, very light colored, transparent mass.

*Example 2.*—The procedure of Example 1 was followed with the exception that 7.67 parts by weight of the caustic soda solution were used instead of 5. The final heat hardened product was very similar in its characteristics to the product of Example 1, except that it was very slightly darker in color.

*Example 3.*—The same amounts of phenol and formaldehyde were used as in Example 1. As a catalyst there was added to the mixture 4 parts by weight of sodium metaborate and 5.5 parts by weight of 2.42N caustic soda solution. The procedure followed to obtain the final heat hardened resin was the same as Example 1. The final product was a clear, transparent mass, having a very light straw color.

In Example 1 the catalyst consisted of sodium hydroxide and boric acid which were present in the molecular ratio of 1.21 to 1. In Example 2 the ratio was 1.29 to 1 and in Example 3 the ratio was 1.42 to 1. The ratio of alkali to boric acid was varied from about 1.2 to 1.45. The amount of acid contained in the formaldehyde used in these experiments was approximately .02%, calculated as sulfuric acid. Therefore, the amount of alkali present in excess of that necessary to neutralize the acidity of the formaldehyde was such that the molecular ratio of available sodium hydroxide to boric acid was approximately that given above.

The ratio of 1.2 to 1.45 represents an excellent range within which my process may be operated. However, I have found that a wider range may be used and I have with very good results used ratios from 1.1 to 1.7. The catalyst should have an alkalinity equal to not over 3% by weight based upon the phenol present and calculated as sodium hydroxide.

While I have described my invention setting forth several specific examples of the operation thereof, it will be apparent to those skilled in the art that various modifications and changes may be made therein. For instance, instead of phenol other phenolic bodies may be used but I have found that phenol itself gives the best results. I need not use caustic soda as the alkali but other compounds may be used such as potash, calcium hydroxide, alkaline carbonates and bicarbonates, and in fact any compounds which will act as alkalies in this reaction. While I have specifically described the use of sodium metaborate, I may use free boric acid or I may use borax or other compounds of boric acid, such as lithium or potassium or other borates. The principal requirement is that the alkali and the boric acid be properly proportioned and the exact chemical combinations in which the components appear is a relatively minor factor.

These and other variations in the invention may be made within the scope thereof, the invention being defined in the claims appended hereto.

What I claim is:

1. A method of preparing phenolic condensation products which comprises providing a mixture of phenol and formaldehyde in the ratio of not substantially more than one mol. of phenol to a mol. of formaldehyde, adding a catalyst thereto containing an alkali and boric acid in the ratio of more than one chemical equivalent of alkali to one of boric acid, heating to cause condensation to take place, evaporating water from the reaction mass in the presence of said catalyst, pouring the product into forms and heating to solidify the same.

2. A method of preparing phenolic condensation products which comprises providing a mixture of phenol and formaldehyde in the ratio of not substantially more than one mol. of phenol to a mol. of formaldehyde, adding a catalyst thereto containing an alkali and boric acid in the ratio of 1.1 to 1.7 chemical equivalents of alkali to one of boric acid, heating to cause condensation to take place, evaporating water from the reaction mass in the presence of said catalyst, pouring the product into forms and heating to solidify the same.

3. A method of preparing phenolic condensation products which comprises providing a mixture of phenol and formaldehyde in the ratio of not substantially more than one mol. of phenol to a mol. of formaldehyde, adding a catalyst thereto containing an alkali and boric acid in the ratio of 1.2 to 1.45 chemical equivalents of alkali to one of boric acid, heating to cause condensation to take place, evaporating water from the reaction mass in the presence of said catalyst, pouring the product into forms and heating to solidify the same.

4. A method of preparing phenolic condensation products which comprises providing a mixture of phenol and formaldehyde in the ratio of not substantially more than one mol. of phenol to a mol. of folmaldehyde, adding a catalyst thereto containing an alkali and boric acid in the ratio of more than one chemical equivalent of alkali to one of boric acid, the total amount of alkali in the catalyst being less than 3% based on the phenol present, heating to cause condensation to take place, evaporating water from the reaction mass in the presence of said catalyst, pouring the product into forms and heating to solidify the same.

5. A method of preparing phenolic condensation products which comprises providing a mixture of phenol and formaldehyde in the ratio of not substantially more than one mol. of phenol to a mol. of formaldehyde, adding a catalyst thereto containing a borate and an alkali in such proportions that there is present more than one chemical equivalent of alkali to one of boric acid, heating to cause condensation to take place, evaporating water from the reaction mass in the presence of said catalyst, pouring the product into forms and heating to solidify the same.

6. A method of preparing phenolic condensation products which comprises providing a mixture of phenol and formaldehyde in the ratio of not substantially more than one mol. of phenol to a mol. of formaldehyde, adding a catalyst thereto containing a borate and an alkali in such proportions that there is present from 1.1 to 1.7 chemical equivalents of alkali to one of boric acid, heating to cause condensation to take place, evaporating water from the reaction mass in the presence of said catalyst, pouring the product into forms and heating to solidify the same.

7. A method of preparing phenolic condensation products which comprises providing a mixture of phenol and formaldehyde in the ratio of not substantially more than one mol. of phenol to a mol. of formaldehyde, adding a catalyst thereto containing a borate and an alkali in such proportions that there is present from 1.2 to 1.45 chemical equivalents of alkali to one of boric acid, heating to cause condensation to take place, evaporating water from the reaction mass in the presence of said catalyst, pouring the product into forms and heating to solidify the same.

8. A method of preparing phenolic condensation products which comprises providing a mixture of phenol and formaldehyde in the ratio of one mol. of phenol to 1–3 mols of formaldehyde, adding a catalyst thereto containing an alkali and boric acid in the ratio of more than one chemical equivalent of alkali to one of boric acid, heating to cause condensation to take place, evaporating water from the reaction mass in the presence of said catalyst, pouring the product into forms and heating to solidify the same.

9. A method of preparing phenolic condensation products which comprises providing a mixture of phenol and formaldehyde in the ratio of one mol. of phenol to 1-3 mols of formaldehyde, adding a catalyst thereto containing an alkali and boric acid in the ratio of 1.1 to 1.7 chemical equivalents of alkali to one of boric acid, heating to cause condensation to take place, evaporating water from the reaction mass in the presence of said catalyst, pouring the product into forms and heating to solidify the same.

10. A method of preparing phenolic condensation products which comprises providing a mixture of phenol and formaldehyde in the ratio of one mol. of phenol to 1-3 mols of formaldehyde, adding a catalyst thereto containing an alkali and boric acid in the ratio of 1.2 to 1.45 chemical equivalents of alkali to one of boric acid, heating to cause condensation to take place, evaporating water from the reaction mass in the presence of said catalyst, pouring the product into forms and heating to solidify the same.

11. A condensation product of phenol and formaldehyde in the solid, permanently hardened state, there being present not substantially more than one mol. of phenol to a mol. of formaldehyde, containing an amount of alkali less than 3% based on the phenol present, and containing boric acid in an amount less than sufficient to completely neutralize the alkali.

12. A condensation product of phenol and formaldehyde in the solid, permanently hardened state, there being present not substantially more than one mol. of phenol to a mol. of formaldehyde, containing an amount of alkali less than 3% based on the phenol present, and containing boric acid in an amount such that there is present 1.1 to 1.7 chemical equivalents of alkali to one of boric acid.

13. A condensation product of phenol and formaldehyde in the solid, permanently hardened state, there being present not substantially more than one mol. of phenol to a mol. of formaldehyde, containing an amount of alkali less than 3% based on the phenol present, and containing boric acid in an amount such that there is present 1.2 to 1.45 chemical equivalents of alkali to one of boric acid.

14. A condensation product of phenol and formaldehyde in the solid, permanently hardened state, there being present not substantially more than one mol. of phenol to a mol. of formaldehyde, containing an amount of alkali less than 3% based on the phenol present, containing boric acid in an amount less than sufficient to completely neutralize the alkali and being substantially free from other added acids.

15. A condensation product of phenol and formaldehyde in the solid, permanently hardened state, there being present not substantially more than one mol. of phenol to a mol. of formaldehyde, containing an amount of alkali less than 3% based on the phenol present, containing boric acid in an amount such that there is present 1.1 to 1.7 chemical equivalents of alkali to one of boric acid and being substantially free from other added acids.

16. A condensation product of phenol and formaldehyde in the solid, permanently hardened state, there being present not substantially more than one mol. of phenol to a mol. of formaldehyde, containing an amount of alkali less than 3% based on the phenol present, containing boric acid in an amount such that there is present 1.2 to 1.45 chemical equivalents of alkali to one of boric acid and being substantially free from other added acids.

17. A condensation product of phenol and formaldehyde in the solid, permanently hardened state, there being present one mol. of phenol to 1-3 mols of formaldehyde, containing an amount of alkali less than 3% based on the phenol present, and containing boric acid in an amount less than sufficient to completely neutralize the alkali.

18. A condensation product of phenol and formaldehyde in the solid, permanently hardened state, there being present one mol. of phenol to 1-3 mols of formaldehyde, containing an amount of alkali less than 3% based on the phenol present, and containing boric acid in an amount such that there is present 1.1 to 1.7 chemical equivalents of alkali to one of boric acid.

19. A condensation product of phenol and formaldehyde in the solid, permanently hardened state, there being present one mol. of phenol to 1-3 mols of formaldehyde, containing an amount of alkali less than 3% based on the phenol present, and containing boric acid in an amount such that there is present 1.2 to 1.45 chemical equivalents of alkali to one of boric acid.

GEORGE BARSKY.